United States Patent
Yun et al.

(10) Patent No.: US 7,372,512 B2
(45) Date of Patent: May 13, 2008

(54) LIQUID CRYSTAL DISPLAY AND FABRICATION METHOD THEREOF

(75) Inventors: Sai Chang Yun, Gyeongsangbook-do (KR); Jae Woo Lee, Gyeongsangbook-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 31 days.

(21) Appl. No.: 10/329,431

(22) Filed: Dec. 27, 2002

(65) Prior Publication Data

US 2003/0174258 A1 Sep. 18, 2003

(30) Foreign Application Priority Data

Mar. 15, 2002 (KR) .............................. 2002-14143

(51) Int. Cl.
*G02F 1/1343* (2006.01)

(52) U.S. Cl. ........................... 349/38; 349/39; 349/143

(58) Field of Classification Search ................. 349/39, 349/143, 38
See application file for complete search history.

(56) References Cited

U.S. PATENT DOCUMENTS

| 5,283,566 | A | * | 2/1994 | Mimura et al. | 345/211 |
|---|---|---|---|---|---|
| 5,528,395 | A | * | 6/1996 | So | 349/42 |
| 5,600,461 | A | * | 2/1997 | Ueda et al. | 349/38 |
| 5,659,375 | A | * | 8/1997 | Yamashita et al. | 349/38 |
| 5,671,027 | A | * | 9/1997 | Sasano et al. | 349/46 |
| 5,686,976 | A | * | 11/1997 | Nishikawa | 349/38 |
| 5,734,177 | A | * | 3/1998 | Sakamoto | 257/49 |
| 5,771,083 | A | * | 6/1998 | Fujihara et al. | 349/147 |
| 5,844,641 | A | * | 12/1998 | Jun et al. | 349/38 |
| 5,886,756 | A | * | 3/1999 | Lee | 349/39 |
| 6,028,650 | A | * | 2/2000 | Kuroha et al. | 349/38 |
| 6,115,089 | A | * | 9/2000 | Hayashi | 349/39 |
| 2001/0011974 | A1 | * | 8/2001 | Kang et al. | 345/60 |

FOREIGN PATENT DOCUMENTS

| JP | 1-241527 | * | 9/1989 |
|---|---|---|---|
| JP | 1-277217 | * | 11/1989 |
| JP | 04-326330 A1 | | 11/1992 |
| JP | 05-002184 A1 | | 1/1993 |
| JP | 06-130412 A1 | | 5/1994 |
| JP | 08-095086 A1 | | 4/1996 |
| KR | 100229677 B1 | | 8/1999 |
| KR | 100438964 B1 | | 6/2004 |

* cited by examiner

*Primary Examiner*—Mike Qi
(74) *Attorney, Agent, or Firm*—Birch, Stewart, Kolasch & Birch, LLP (57) ABSTRACT

A liquid crystal display employs an on-common storage capacitor which includes a lower storage electrode of a predetermined size provided in the same layer that a signal line is formed, and a pixel electrode provided on the lower storage electrode, and functioning as an upper storage electrode. A method of fabricating the liquid crystal display is also provided.

19 Claims, 5 Drawing Sheets

LIQUID CRYSTAL DISPLAY AND FABRICATION METHOD THEREOF

This nonprovisional application claims priority under 35 U.S.C. § 119(a) on Patent Application No. 14143/2002 filed in Korea on Mar. 15, 2002, which is herein incorporated by reference.

BACKGROUND OF THE INVENTION

1. Field of the Invention

The present invention relates to a liquid crystal display, and more particularly, to a liquid crystal display employing an on-common type storage capacitor for providing a uniform orientation film and improving the optical characteristic thereof by reducing the step height of a pixel electrode, and a method of fabricating the same.

2. Discussion of the Background Art

For a long time, a cathode ray tube (CRT) display has been used as a display for displaying image information on a screen, but its large volume and heavy weight compared with the display area create inconveniences and difficulties in using it.

For this reason, a thin flat type display that can be used anywhere because of its large display area and reduced thickness was developed and is now replacing the CRT. In particular, a liquid crystal display (LCD) is the one that has a characteristic of having higher resolution than other types of flat displays, and a rapid response speed comparable to the display quality of the CRT when displaying moving images.

As widely known, the driving principle of the LCD is based on the optical anisotropy and polarization. If an electromagnetic field is applied from the outside to the liquid crystal molecules that are thin and long in their structure and have orientation and polarization in their alignment, the alignment direction of the liquid crystal molecules can be artificially adjusted. Therefore, the artificial control of their alignment direction allows light to be transmitted or blocked depending on the alignment direction of the liquid crystal molecules and thereby, colors and images can be displayed.

An active matrix liquid crystal display in which a non-linear characteristic active device is formed at each of pixels arranged in a matrix configuration controls the operation of each pixel by using the switching characteristic of the active device, and realizes a memory function by an electro-optical effect of the liquid crystal.

In the active matrix liquid crystal display, it is required to maintain a signal voltage input through the signal lines at a constant level for a predetermined time until the next input of another signal so as to secure the uniformity of the displayed images. For this requirement, a storage capacitor should be formed in parallel with the liquid crystal cells.

Here, the storage capacitor formed on the liquid crystal display can be divided into on-common type and on-gate type depending on the type of electrode used.

In view of the difference between these two types of storage capacitors, the on-gate type has advantages of little decrease of the aperture ratio because it uses a part of the (n−1)-th scanning line as a charge electrode of the n-th pixel, unnoticeable characteristic in case of the occurrence of point defects in normally white (NW) mode, and good production yield, but has disadvantages of a long scanning signal time.

Meanwhile, the on-common type, which uses a charge electrode separately, has an advantage of a short scanning signal time, but has disadvantages of substantial decrease of the aperture ratio, and noticeable characteristic in case of the occurrence of point defects in NW mode, which results in low production yield.

Figure 1:
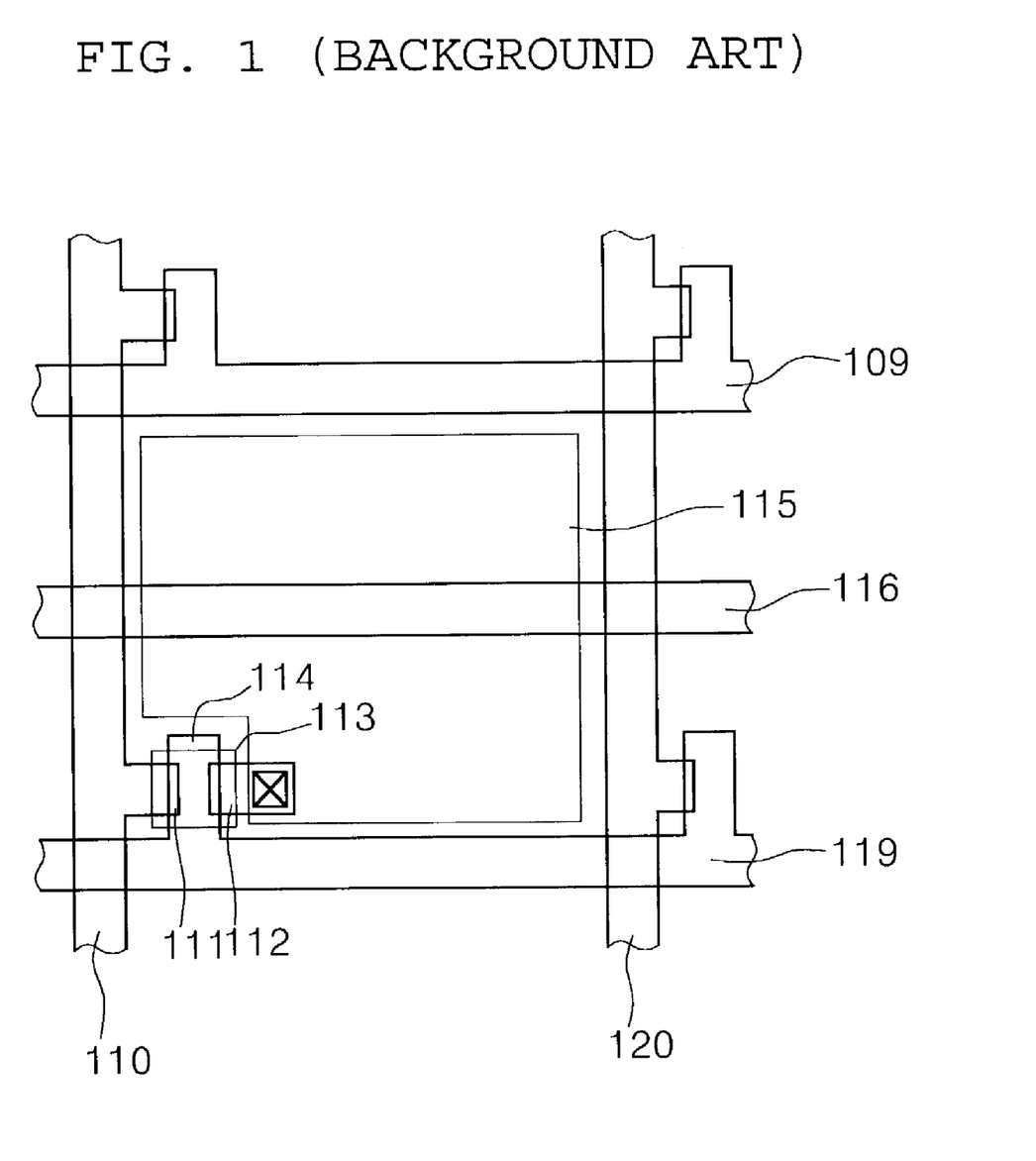
FIG. 1 is a schematic diagram of a TFT array including on-common type storage capacitors provided in a liquid crystal display of the Background Art.

The on-common type storage capacitor is briefly described with reference to FIG. 1. FIG. 1 is a schematic diagram of a thin film transistor (TFT) array including on-common type storage capacitors provided in a conventional liquid crystal display.

Referring to FIG. 1, a TFT array with an on-common type storage capacitor has an intersection part defined by the crossing of scanning lines 109, 119 and signal lines 110, 120, on an insulating substrate (a lower substrate). At the portion crossed by a signal line (ex. 110) and a scanning line (ex. 119), there is formed a thin film transistor (TFT) including a source electrode 111 (extended from signal line 110) and a drain electrode 112, a gate electrode 114 (extended from scanning line 119) and a semiconductor layer 113.

In addition, a pixel electrode 115 is connected to the drain electrode 112 and spaced apart by a constant interval from the scanning line 119 and the signal line 110. A lower storage electrode 116 is placed to cross the pixel electrode 115 in parallel with the scanning line 119.

The on-common type storage capacitor structured as described above accumulates charges between the pixel electrode 115 functioning as the upper storage electrode and the lower storage electrode 116 formed of the same material as the gate electrode 114.

The electrostatic capacitance accumulated in the storage capacitor can be represented as follows.

$$C = \epsilon \frac{A}{d}$$

The electrostatic capacitance is calculated by the above equation. Here, C is an electrostatic capacitance, $\epsilon$ is a dielectric constant, A is the area of the electrode, and d is the interval between the electrodes.

To secure the uniformity of the images displayed on the liquid crystal display, the greater the capacitance of the storage capacitor the better the result.

Figure 2:
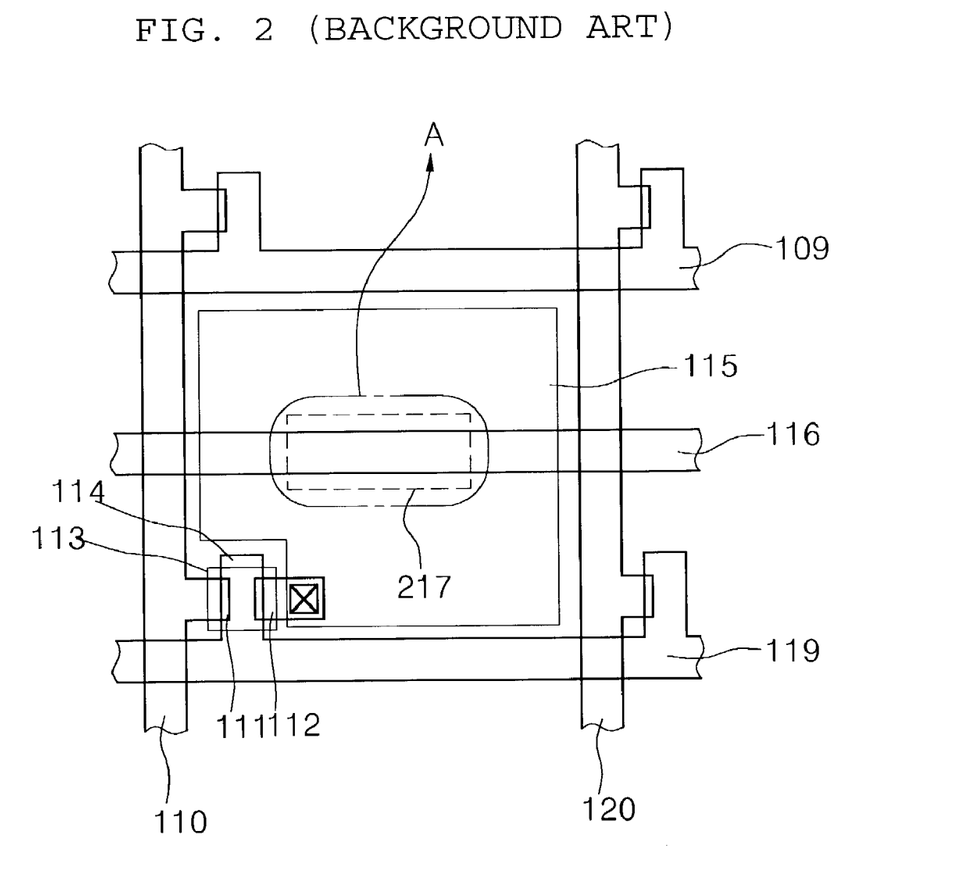
FIG. 2 is a schematic diagram of a TFT array including improved on-common type storage capacitors provided in a liquid crystal display of the Background Art.
Figure 3:
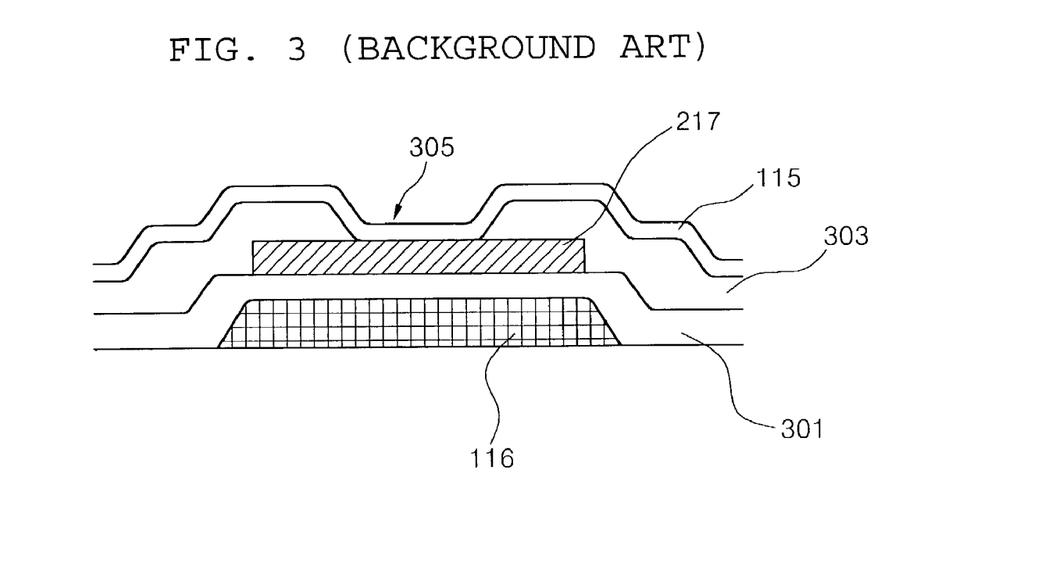
FIG. 3 is a detailed sectional view of the region A of FIG. 2.

As one means of achieving this, an additional upper storage electrode is formed below the pixel electrode as shown in FIGS. 2 and 3, to reduce the interval (d) between the electrodes and to increase the capacitance.

FIG. 2 is a schematic diagram of the TFT array of an improved on-common type storage capacitor used in a liquid crystal display of the background art, and FIG. 3 is a detailed sectional view of the portion "A" in FIG. 2.

As shown in FIGS. 2 and 3, the TFT array of an improved on-common type storage capacitor is similar in structure to that shown in FIG. 1. Therefore, the same reference numerals are used to refer to the same or like parts, and an additional description will be made here for different parts.

The basic structure of the TFT array of an improved on-common type storage capacitor is similar to the structure of the TFT array shown in FIG. 1, but only the upper storage electrode 217 is changed.

As shown in FIGS. 2 and 3, the upper storage electrode 217 (having a predetermined size) is formed in the same layer that the signal line 110 is formed by using the same material as the signal line 110.

In addition, a through hole region 305 for a through hole is provided in a part of a passivation film 303 covering the upper storage electrode 217. The pixel electrode 115 and the upper storage electrode 217 are electrically connected through the through hole region 305.

The improved on-common type storage capacitor structured as above has charges accumulated between the upper storage electrode 217 (having the same material as the signal line 110), and the lower storage electrode 116, having the same material as the gate electrode 114.

In comparison with the on-common type storage capacitor shown in FIG. 1, the interval between the two electrodes forming the storage capacitor is reduced and thus, a relatively large capacitance can be secured.

Now hereinafter, a method of fabricating a TFT array of the improved on-common storage capacitor is briefly illustrated with reference to FIGS. 2 to 4.

Figure 4:
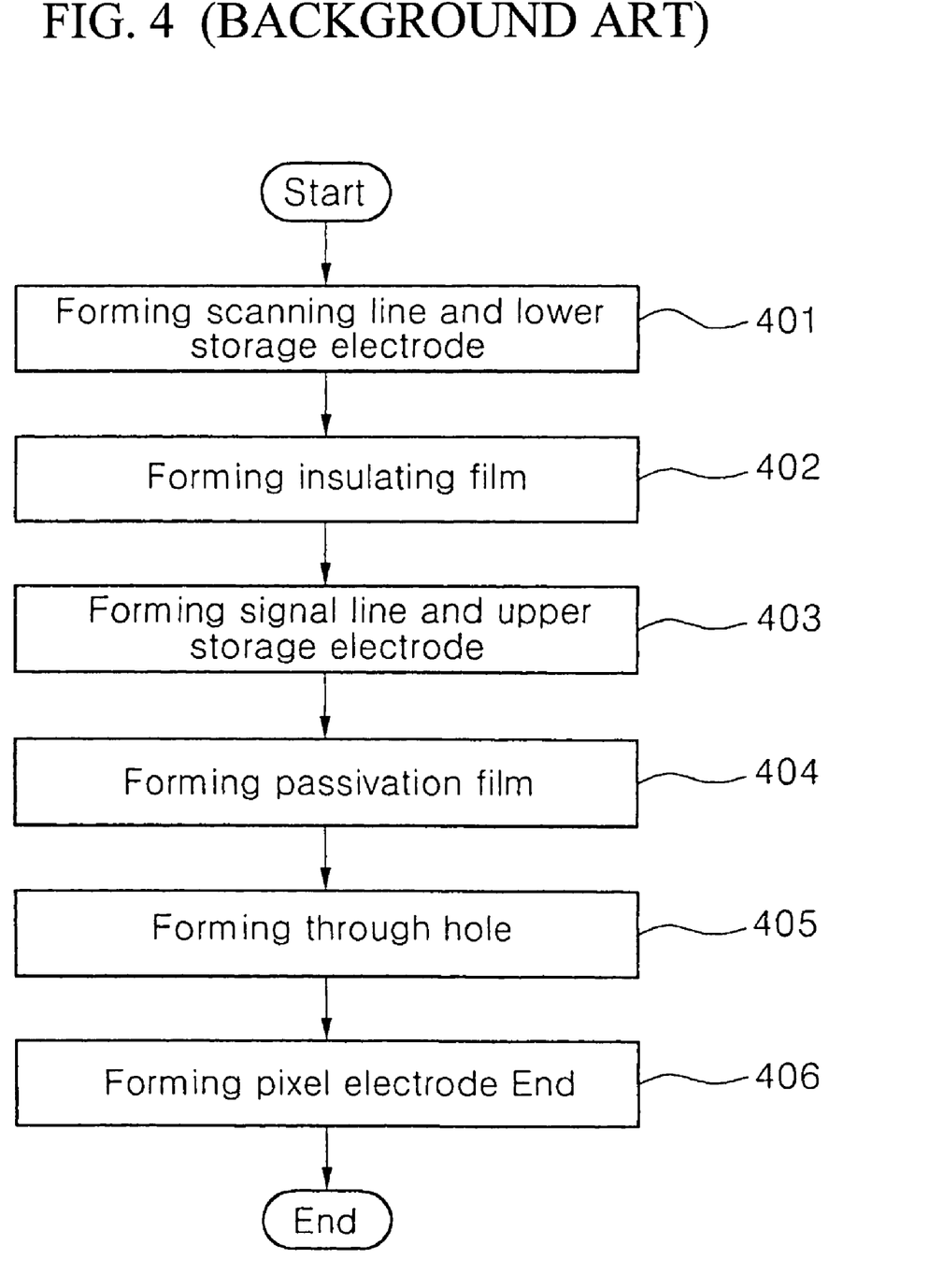
FIG. 4 is a flow diagram of a method of fabricating a TFT array including improved on-common type storage capacitors provided in a liquid crystal display of the Background Art.

FIG. 4 is a flow diagram depicting a method of fabricating the TFT array of the improved on-common type of storage capacitor used in a liquid crystal display of the Background Art. Here, general processing steps of fabricating a TFT array are omitted, and the method described herein focuses primarily on the region of the on-common type storage capacitor.

First, there is provided on a substrate, a plurality of scanning lines 109, 119 and an on-common type lower storage electrode 116 (of a predetermined size) in parallel with the plurality of scanning lines 109, 119 (step 401). Here, the plurality of scanning lines 109, 119 and the on-common type lower storage electrode 116 in parallel with the plurality of the scanning lines 109, 119 are formed of the same material as the gate electrode 114 during the formation of the gate electrode 114, and thus, a separate masking process is not necessary. An insulating layer 301 is formed on the plurality of scanning lines 109, 119, the lower storage electrode 116, and the gate electrode 114 (step 402).

Then, an on-common type upper storage electrode 217 is formed on the on-common type storage lower substrate 116, and a plurality of signal lines 110, 120 are formed to cross the plurality of scanning lines 109 and the 119 at a right angle (step 403). The upper storage electrode 217 and the plurality of signal lines 110, 120 are formed of the same material as the source/drain electrode 111, 112 during the formation of the source/drain electrode 111, 112, and thus, a separate masking process is not necessary. Then, a passivation film 303 is formed on the plurality of signal lines 110, 120, the upper storage electrode 217, and the source/drain electrode 111, 112 (step 404).

At a predetermined region of the passivation film 303 formed on the upper storage electrode 217, a through-hole is formed (step 405), and then, a pixel electrode is formed at the matrix-shaped region defined by the plurality of scanning lines 109, 119 and the plurality of signal lines 110, 120 (step 406).

The pixel electrode 115 formed on the passivation film 303, and the upper storage electrode 217 can be electrically connected via the through-hole region 305. Accordingly, the electrostatic capacitance of the on-common type storage capacitor can be increased more than the electrostatic capacitance of the on-common type storage capacitor in FIG. 1, by accumulating charges between the lower storage electrode 116 and the upper storage electrode 217.

However, the TFT array of the improved on-common type storage capacitor structured as shown in FIG. 3 has a large step height in the pixel electrode 115 (especially, in the through hole region). Therefore, when forming an orientation film for alignment of liquid crystal, a problem occurs in that the orientation film may not be formed uniformly. In case the orientation film is not uniform, the liquid crystal molecules are not aligned properly, and an optical failure such as light leakage may occur.

To form the TFT array as shown in FIG. 3, the through hole is formed as illustrated in the steps 405 and 406, and the pixel electrode 115 and the upper storage electrode 217 are connected electrically via the through-hole region 305. In the step 405, an etch process is performed to form the through-hole in the predetermined region of the passivation film 303.

However, a point defect may be generated by a nonuniform etch when forming the through hole by the etch process and exposing the upper storage electrode 217. Therefore, resistance may be increased when electrically connecting the upper electrode 217 and the pixel electrode 115, and finally, a white defect may be generated in the pixel to display images, and the TFT array ends up with a failure.

SUMMARY OF THE INVENTION

Accordingly, the present invention is directed to a liquid crystal display and a fabrication method thereof that substantially obviate one or more problems due to limitations and disadvantages of the Background Art.

An object of the present invention is to provide a liquid crystal display and a fabrication method thereof that are capable of increasing electrostatic capacitance and reducing the step height of a pixel electrode, thereby forming a uniform orientation film and improving optical properties.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a liquid crystal display including an on-common type storage capacitor. The on-common type storage capacitor includes a lower storage electrode of a predetermined size provided in the same layer that a signal line is formed, and a pixel electrode provided on the lower storage electrode and functioning as an upper storage electrode.

Preferably, the lower storage electrode is formed of the same material as the signal lines.

Also, the lower storage electrode is formed in parallel with the signal lines to cross the pixels at a right angle, and connected to the pixels in the vertical direction.

In addition, the lower storage electrode further includes a predetermined size of a wing in parallel with the scanning lines that are provided to cross the signal lines at a right angle.

In another aspect of the present invention, a liquid crystal display includes a substrate, a plurality of scanning lines formed on the substrate, a plurality of signal lines formed on the substrate to cross the plurality of scanning lines at a right angle, a TFT formed on the cross portion of the scanning line and the signal line, an on-common type lower storage electrode provided to cross the scanning lines at a right angle, and be in parallel with the signal lines in the same layer that the signal lines are formed, and a pixel electrode provided at the matrix region defined by the cross of the scanning lines and the signal lines, and functioning as an on-common type upper storage electrode.

In another aspect of the present invention, there is a method of fabricating a liquid crystal display. First, a plurality of scanning lines is formed on a substrate, and an insulating layer is formed on the plurality of scanning lines. Then, there are formed a plurality of signal lines which cross the plurality of scanning lines at a right angle, and there are a plurality of lower storage electrodes in parallel with the signal lines on the insulating layer. Subsequently, a passivation film is formed on the plurality of signal lines and the plurality of lower storage electrodes, and a pixel electrode is formed on the passivation film and at the matrix region defined by the cross of the scanning lines and the signal lines, and functioning as an upper storage electrode.

The present invention is characterized in that the lower storage electrode is formed of the same material as the signal lines.

Also, the lower storage electrode is formed in parallel with the signal lines to cross the pixels at a right angle, and connected to the all pixels in the vertical direction.

In addition, the lower storage electrode further includes a predetermined size of a wing in parallel with the scanning lines that are provided to cross the signal lines at a right angle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 5:
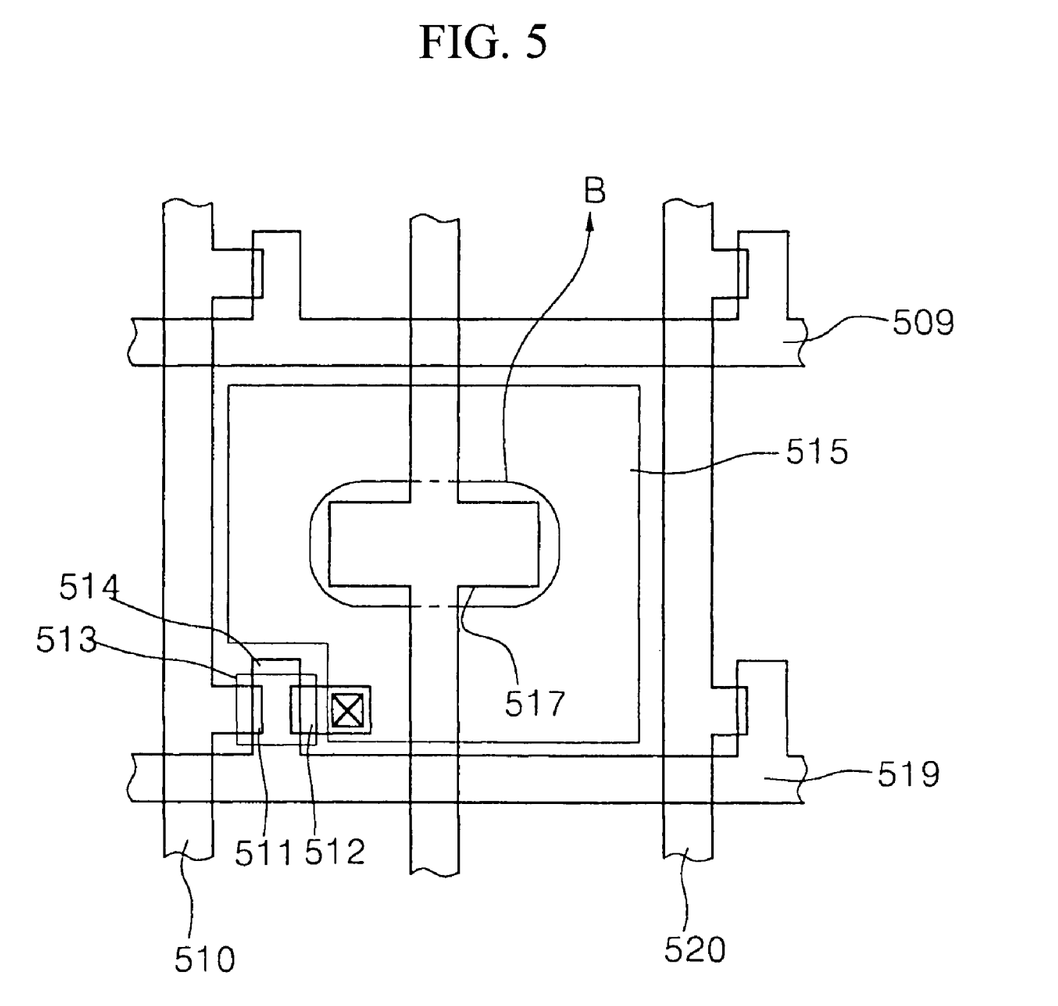
FIG. 5 is a schematic diagram of a TFT array including on-common type storage capacitors provided in a liquid crystal display of the present invention.
Figure 6:
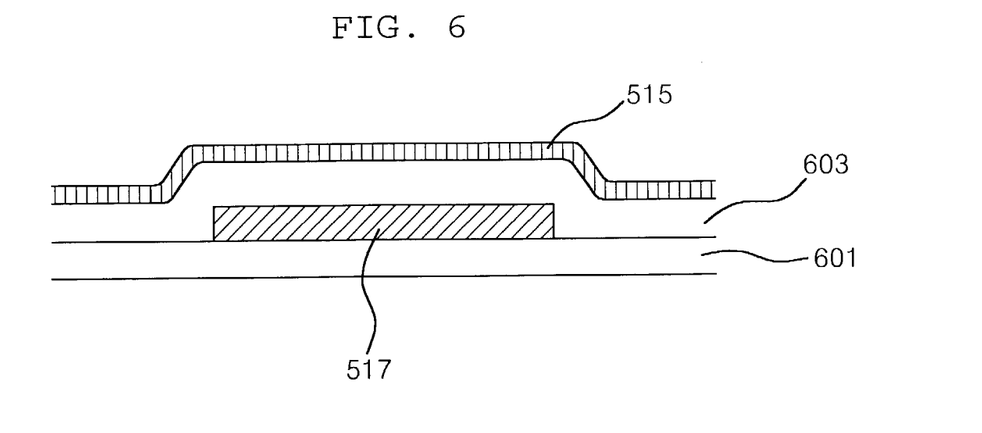
FIG. 6 is a detailed sectional view of the region B of FIG. 5.

FIG. 5 is a schematic diagram of a TFT array of on-common type storage capacitors used in a liquid crystal display of the present invention, and FIG. 6 is a detailed sectional view of the portion B of FIG. 5.

Referring to FIGS. 5 and 6, a TFT array of the present invention in which an on-common type storage capacitor is formed includes: a substrate (not shown); a plurality of scanning lines 509, 519 formed on the substrate; a plurality of signal lines 510, 520 formed on the substrate to cross the plurality of scanning lines 509, 519 at a right angle, a TFT formed on the cross portion of the scanning lines 509, 519 and the signal lines 510, 520; an on-common type lower storage electrode 517 formed to cross the scanning lines 509, 519 at a right angle and be in parallel with the signal lines 510, 520 in the same layer as the signal lines 510, 520; and a pixel electrode 515 formed at the matrix region defined by the cross of the scanning lines 509, 519 and the signal lines 510, 520, and functioning as the on-common type upper storage electrode.

The on-common type storage capacitor of the present invention (structured as above) accumulates charges between the lower storage electrode 517 formed of the same material as the signal lines 510, 520 and the pixel electrode 515 functioning as the upper storage electrode.

Therefore, according to the on-common type storage capacitor of the present invention structured as above, the interval d between the upper storage electrode 515 and the lower electrode 517 becomes narrower compared with that of the Background Art, so that the on-common type storage capacitor can secure a larger electrostatic capacitance.

In addition, the lower electrode 517 of the on-common type storage capacitor according to the present invention has a predetermined size of a wing formed in parallel with the scanning lines 509, 519.

The wing is formed to secure a required electrostatic capacitance. The electrostatic capacitance can be increased by increasing the area "A" of the electrode by increasing the size of the wing, and the shape of the wing is not restricted to the rectangular shape shown in FIG. 5, which is apparent to those skilled in the art of the present invention.

In addition, as shown in FIG. 5, the lower storage electrode 517 forming the on-common type storage capacitor of the present invention is formed in parallel with the signal lines 510, 520 to cross the pixel at a right angle, and is connected to the pixels in the vertical direction.

In addition, it is shown that the TFT array of the on-common type storage capacitor of the present invention does not have a large step height difference over the pixel electrode 517 (shown in FIG. 6).

Accordingly, an orientation film for the alignment of the liquid crystal molecules can be formed uniformly during its formation process, which prevents light leakage. Light leakage is one of the problems causing optical failures in the Background Art due to the alignment failure of the liquid crystal molecules.

In addition, the method for forming the TFT array as shown in FIG. 3 has an inconvenience because it requires the steps of forming a through-hole by an etching process, and electrically connecting the pixel electrode 115 and the upper storage electrode 217 via the through-hole region 305. However, the method of fabricating the on-common type storage capacitor of the present invention does not require the step of forming the through-hole.

Furthermore, the method of forming a TFT array of the present invention fundamentally prevents the generation of point defects, which occur in the conventional formation process of a through-hole.

In the conventional on-common type storage capacitor, point defects are often generated due to nonuniform etching when forming a through hole by the etching process, and exposing the upper storage electrode 217. As a result, resistance may be increased when the upper electrode 217 and the pixel electrode 115 are electrically connected, and finally white defect is generated in pixels to display images, so that the TFT array cannot be used.

However, according to the present invention, the through-hole formation process itself is not necessary, and thus, the TFT array failure generated by white defect in pixels caused by point defects can be prevented.

Figure 7:
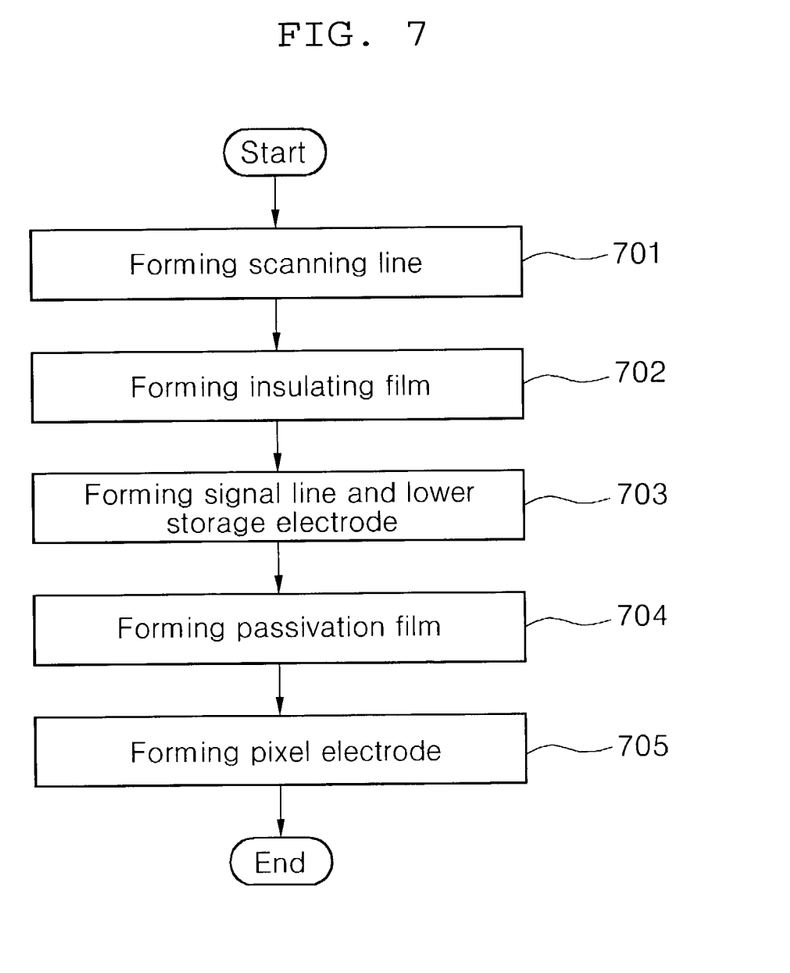
FIG. 7 is a flow diagram of a method of fabricating a TFT array including improved on-common type storage capacitors provided in a liquid crystal display of the present invention.

FIG. 7 is a flow diagram of the method of fabricating a TFT array of an improved on-common type storage capacitor used in a liquid crystal display of the present invention. An explanation of a general process for forming the TFT array is omitted herein, and a description of the region on which an on-common type storage capacitor is formed will be made.

First, a plurality of scanning lines 509, 519 is formed on the substrate (not shown) (step 701). The scanning lines 509, 519 are formed of the same material as the gate electrode 514 during the formation of the gate electrode 514, so that a separate masking process is not necessary. An insulating layer 601 is formed on the plurality of scanning lines 509, 519 and the gate electrode 514 (step 702).

Subsequently, on the insulating layer 601 are formed a plurality of signal lines 510, 520 crossing the plurality of scanning lines 509, 519 at a right angle, and a plurality of lower storage electrodes 517 in parallel with the signal lines 510, 520 (step 703). The lower storage electrode 517 and the plurality of signal lines 510, 520 are formed of the same material as the source/drain electrode 511, 512 when forming the source/drain electrode 511, 512, so that a separate masking process is not necessary.

In the TFT array of the on-common type storage capacitor of the present invention, the lower storage electrode 517 is formed in the layer of the signal lines 510, 520 (not in the layer of the gate electrode 514).

Accordingly, a layer of gate metal is not formed on the region of the storage capacitor, as shown in FIG. 6, and the lower storage electrode 517 is formed on the flat insulating layer 601.

In addition, the lower storage electrode 517 has a predetermined size of a wing in parallel with the scanning lines 509, 519. The wing is formed to secure a required electrostatic capacitance, and the electrostatic capacitance of the on-common type storage capacitor may be increased by increasing the size of the wing.

A passivation film 603 is formed on the plurality of signal lines 510, 520 and the plurality of lower storage electrodes 517 (step 704). Then, a pixel electrode 515 functioning as an upper storage electrode is formed on the passivation film 603 (step 705). The pixel electrode 515 is formed at the matrix region defined by the cross of the scanning lines 509, 519 and the signal lines 510, 520.

Accordingly, a TFT array of an on-common type storage capacitor of the present invention is formed by the above fabrication process. Therefore, according to the present invention, the fabrication process of a TFT array of an on-common type storage capacitor can be performed more easily than the case of a TFT array of the Background Art, and the more improved TFT array can be produced.

As described above, according to the liquid crystal display and the method of fabricating the same of present invention employing an on-common type storage capacitor, the interval between the electrodes is reduced by forming a lower storage electrode in the same layer that the signal lines are formed, and using a pixel electrode as an upper storage electrode, thereby increasing the electrostatic capacitance. Further, the step height of the pixel electrode is reduced, thereby uniformly forming the orientation film and improving the optical characteristics.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display comprising:
a substrate;
a data line on the substrate;
a lower storage electrode of a storage capacitor of a pixel, the lower storage electrode being spaced apart from the data line and having a first portion extending parallel to the data line and a second portion extending perpendicular to the data line, said first portion and said second portion being a single piece structure of uniform thickness, said first portion being formed of the same material as said second portion;
a lower insulating layer on the substrate, the lower storage electrode and the data line being directly on an upper surface of the lower insulating layer; and
a pixel electrode provided over the lower storage electrode, and functioning as an upper storage electrode of the storage capacitor of the pixel.

2. The liquid crystal display of claim 1, wherein the lower storage electrode is formed of the same material as the data line.

3. The liquid crystal display of claim 1, wherein the first portion of the lower storage electrode is formed to cross the pixel electrode at a right angle.

4. The liquid crystal display of claim 1, wherein a longest portion of the lower storage electrode is in parallel with the data line.

5. The liquid crystal display of claim 1, wherein the lower storage electrode forms the storage capacitor with the pixel electrode in a vertical direction.

6. The liquid crystal display of claim 1, wherein the second portion comprises a predetermined size of a wing in parallel with a scanning line that is provided to cross the data line at a right angle.

7. The liquid crystal display of claim 1, wherein the lower insulating Layer is located between the lower storage electrode and the substrate.

8. The liquid crystal display of claim 7, further comprising at least one scanning line on the substrate, the lower insulating layer covering a top surface of the at least one scanning line.

9. A liquid crystal display comprising:
a substrate;
a plurality of scanning lines formed on the substrate;
a plurality of data lines formed on the substrate to cross the plurality of scanning lines at a right angle;
a thin film transistor formed on the cross portion of one of said scanning lines and one of said data lines;
an on-common lower storage electrode of an on-common storage capacitor of a pixel, the lower storage electrode being spaced apart from the data line and being provided to cross the scanning lines at a right angle and be in parallel with the data lines, said lower storage electrode having a first portion extending parallel to the data lines and a second portion extending perpendicular to the data lines, said first portion and said second portion being a single piece structure of uniform thickness, said first portion being formed of the same material as said second portion;

a lower insulating layer on the substrate, the lower storage electrode and the data lines being directly on an upper surface of the lower insulating layer; and a pixel electrode provided at a matrix region defined by the crossing of the scanning lines and the data lines, and functioning as an on-common upper storage electrode of the on-common storage capacitor of the pixel.

10. The liquid crystal display of claim 9, wherein the lower storage electrode is formed of the same material as the data line.

11. The liquid crystal display of claim 9, wherein the first portion of the lower storage electrode is formed to cross the pixel electrode at a right angle.

12. The liquid crystal display of claim 9, wherein a longest portion of the lower storage electrode is in parallel with one of said data lines.

13. The liquid crystal display of claim 9, wherein the lower storage electrode forms the on-common storage capacitor with the pixel electrode in a vertical direction.

14. The liquid crystal display of claim 9, wherein the second portion comprises a predetermined size of a wing in parallel with one of said scanning lines, which is provided to cross one of said data lines at a right angle.

15. The liquid crystal display of claim 9, wherein the insulating layer is located between the lower storage electrode and the substrate.

16. The liquid crystal display of claim 15, wherein the lower insulating layer covers a top surface of the plurality of scanning lines.

17. A liquid crystal display comprising:

a substrate;

a data line on the substrate;

a lower storage electrode of a storage capacitor of a pixel, the lower storage electrode being spaced apart from the data line and having a first portion extending parallel to the data line and a second portion extending perpendicular to the data line, said first portion and said second portion being a single piece structure of uniform thickness, said first portion being formed of the same material as said second portion, the lower storage electrode being above a lower insulating layer;

the lower insulating layer on the substrate, the lower storage electrode and the data line being directly on an upper surface of the lower insulating layer; and a pixel electrode provided over the lower storage electrode, and functioning as an upper storage electrode of the storage capacitor of the pixel.

18. The liquid crystal display of claim 17, wherein the insulating layer is located between the lower storage electrode and the substrate.

19. The liquid crystal display of claim 18, further comprising at least one scanning line on the substrate, the lower insulating layer covering a top surface of the at least one scanning line.

* * * * *